(12) United States Patent
Uenosono et al.

(10) Patent No.: US 7,350,975 B2
(45) Date of Patent: Apr. 1, 2008

(54) HYDRODYNAMIC BEARING DEVICE AND SPINDLE MOTOR

(75) Inventors: Kaoru Uenosono, Ozu (JP); Yosei Yoshikawa, Touon (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 305 days.

(21) Appl. No.: 11/296,538

(22) Filed: Dec. 8, 2005

(65) Prior Publication Data
US 2006/0133704 A1 Jun. 22, 2006

(30) Foreign Application Priority Data
Dec. 8, 2004 (JP) .............................. 2004-354762

(51) Int. Cl.
*F16C 32/06* (2006.01)
(52) U.S. Cl. ...................................... 384/107
(58) Field of Classification Search ................ 384/100, 384/107, 114; 310/90; 360/99.08, 98.07
See application file for complete search history.

(56) References Cited

U.S. PATENT DOCUMENTS 6,499,882 B2 * 12/2002 Takahashi et al. .......... 384/107
7,241,050 B2 * 7/2007 Uenosono et al. .......... 384/107
2002/0018603 A1 * 2/2002 Narita ........................ 384/100

FOREIGN PATENT DOCUMENTS

JP 11-82486 3/1999

* cited by examiner

*Primary Examiner*—Thomas R. Hannon
(74) *Attorney, Agent, or Firm*—Steptoe & Johnson LLP

(57) ABSTRACT

The invention provides a hydrodynamic bearing device with a function of circulating the operating fluid by supplying the operating fluid to between the cover and the sleeve by way of a circular communication path, the hydrodynamic bearing device allowing the cover for covering the sleeve to be satisfactorily bonded, preventing the operating fluid from leaking outward, and preventing the adhesive from blocking the opening of the circular communication path; and a spindle motor. An adhesive inflow allowing space for allowing the adhesive from the adhesive setting and bonding part to flow in is formed between the adhesive setting and bonding part for setting the adhesive and bonding the cover and the sleeve, and a space region on the open end side between the cover and the sleeve for circulating and introducing the operating fluid so as to create a space in the cover.

18 Claims, 11 Drawing Sheets

HYDRODYNAMIC BEARING DEVICE AND SPINDLE MOTOR

BACKGROUND OF THE INVENTION

1. Field of the Invention

The invention relates to a spindle motor for rotatably driving a magnetic disc, an optical disc and the like, and a hydrodynamic bearing device used in the spindle motor and the like.

2. Description of the Related Art

Instead of a ball bearing device conventionally used, a hydrodynamic bearing device excelling in rotating precision and silence than the ball bearing is widely adopted for the bearing device used in the spindle motor and the like of a hard disc drive.

This type of hydrodynamic bearing device includes a hydrodynamic bearing device disclosed in for example, JP-A 11-82486 (1999). As shown in FIG. 13, the hydrodynamic bearing device includes a shaft 51, a sleeve 52 arranged on the outer periphery of the shaft 51 with a gap in between, and thrust flanges 53 and 54 of thick diameter arranged on both ends of the shaft 51 and arranged in an orientation that includes a gap with respect to both end faces of the sleeve 52. A working fluid consisting of lubricant oil is filled into the gap between the outer peripheral surface of the shaft 51 and the inner peripheral surface of the sleeve 52, and the gap between the surface on the inner side of the thrust flanges 53 and 54 (lower surface of the thrust flange 53 and the upper surface of the thrust flange 54) and both end faces of the sleeve 52 facing the respective surface of the flange. A dynamic pressure generating groove 56 is formed on the outer peripheral surface of the shaft 51 and a radial hydrodynamic bearing is configured in which, when the shaft 51 and the sleeve 52 are relatively rotated by the motor rotational driving force not shown, the shaft 51 and the sleeve 52 are supported in a freely rotating manner through a predetermined gap in a radial direction (direction of radius) by the pressure of the working fluid collected by the dynamic pressure generating groove 56. The dynamic pressure generating grooves 57 and 58 are formed on the surface on the inner side of the of the thrust flanges 53 and 54 and a thrust hydrodynamic bearing is configured in which, when the thrust flanges 53 and 54 attached to the shaft 51 and the sleeve 52 are relatively rotated by the motor rotational driving force, the shaft 51 and the sleeve 52 are supported in a freely rotating manner through a predetermined gap in a thrust direction (direction of bearing axis) by the pressure of the working fluid collected by the dynamic pressure generating grooves 57 and 58.

In this hydrodynamic bearing device, a plurality of communication paths 59 extending parallel to the bearing axis are formed at an intermediate location between the inner peripheral surface and the outer peripheral surface of the sleeve 52 at every appropriate angle (e.g., 180°) with the bearing axis as the center. A space between the surface on the inner side of the thrust flanges 53 and 54 and both end faces of the sleeve 52 facing the respective surface of the flange is communicated by the communication paths 59. Fluid closing members 60 and 61 are fitted to the inner peripheral part of both ends of the sleeve 52 so as to face the outer peripheral surface of the thrust flanges 53 and 54 across a clearance. Inclined surfaces 60a and 61a of conical shape are formed at the location of the fluid closing members 60 and 61 facing the communication paths 59, and the locations facing the inclined surfaces 60a and 61a become the fluid storage spaces 64 and 65 where the working fluid is stored.

The clearance is formed between the outer peripheral surface of the thrust flanges 53 and 54 and the inner peripheral surfaces of the fluid closing members 60 and 61 and is communicated to the outside air (atmospheric pressure). Fluid sealing parts 62 and 63 for sealing the working fluid on the internal side of the hydrodynamic bearing device are also arranged using the surface tension of the working fluid.

Therefore, the configuration given above is such in which even when the pressure of the working fluid becomes uneven at the space between the outer peripheral surface of the shaft 51 formed with the radial hydrodynamic bearing and the inner peripheral surface of the sleeve 52, and the space between the surface on the inner side of the thrust flanges 53 and 54 formed with the thrust hydrodynamic bearing and both end faces of the sleeve 52 facing the respective surface of the flange due to formation of the communication paths 59, and a pressure difference is created, such pressure difference is resolved. That is, even if the pressure of the working fluid becomes uneven by arranging the communication paths 59, adjustment is made to eliminate the pressure difference between the working fluids to stabilize the bearing function or to prevent the working fluid from jumping outward.

In the general hydrodynamic bearing device of this type, the clearance where the radial hydrodynamic bearing is formed or the clearance where the thrust hydrodynamic bearing is formed is extremely small, and thus the work of assembling the hydrodynamic bearing device and then filling the working fluid into the hydrodynamic bearing includes filling the working fluid to the inner part of the hydrodynamic bearing device so that the fluid is satisfactorily filled to the inner part. Even so, however, one part of air sometimes enters or remains in the space between the outer peripheral surface of the shaft 51 formed with the radial hydrodynamic bearing and the inner peripheral surface of the sleeve 52, and the space between the surface on the inner side of the thrust flanges 53 and 54 formed with the thrust hydrodynamic bearing and both end faces of the sleeve 52 facing the respective surface of the flange. Further, rotation of the hydrodynamic bearing device may involve and mix small air bubbles in the working fluid. Therefore, when the air enters the inner part as air bubbles and attaches to the dynamic pressure generating groove 56 of the radial hydrodynamic bearing or the dynamic pressure generating grooves 57 and 58 of the thrust hydrodynamic bearing, the pressure generated by the working fluid in the dynamic pressure generating grooves 56, 57 and 58 becomes disturbed, thus lowering the bearing performance such as, lower bearing stiffness due to air bubbles, and instability of rotation during rotating operation.

The fluid closing members for sealing the working fluid in the bearing are fixed to the sleeve, but if adhesive and the like are used to enhance sealability, the adhesive may flow into the bearing thereby causing disadvantages such as lock.

SUMMARY OF THE INVENTION

The invention aims to provide a hydrodynamic bearing device that exhausts air bubbles mixed into or produced in the bearing with a circulating function of the working fluid by supplying the working fluid in between the cover and the sleeve by way of the circular communication path, and that in which the cover for covering the sleeve is satisfactorily adhered to prevent the working fluid from leaking to the outside or the adhesive from blocking the opening of the circular communication path; and a spindle motor.

In order to solve the above problem, the invention relates to a hydrodynamic bearing device comprising a shaft, a sleeve including a bearing hole with an open end that opens and a close end that is closed, the shaft being inserted into the bearing hole for freely rotating with a predetermined gap in between, a cover attached to the sleeve and covering an end face on the open end side of the sleeve in an orientation of including a space, a radial dynamic pressure generating groove formed on at least one of an outer peripheral surface of the shaft and an inner peripheral surface of the sleeve where the shaft and the sleeve face each other, the dynamic pressure generating groove supporting the shaft with respect to the sleeve in a relatively rotatable fashion in a radial direction in a non-contacting manner, a circular communication path formed in the sleeve, for communicating a space region on the close end face of the sleeve and a space region on the open end side between the cover and the end face on the open end side of the sleeve, a working fluid being filled into a space in the sleeve including at least one part of the space region on the open end side between the cover and the sleeve, whereby when the shaft is relatively rotated with respect to the sleeve, the working fluid is circulated through a space between the shaft and the sleeve, the space region on the close end side leading to the space between the shaft and the sleeve, the circular communication path leading to the space region on the close end side, and the space region on the open end side between the cover and the sleeve leading to the circular communication path. Herein, an adhesive inflow allowing space is formed between an adhesive setting and bonding part for setting the adhesive and bonding the cover and the sleeve, and the space region on the open end side between the cover and the sleeve for circulating and introducing the working fluid, so as to include a space in at least one of either the cover or the sleeve to allow the inflow of the adhesive from the adhesive setting and bonding part.

In the above configuration, by having the setting amount of the adhesive greater than the setting amount to the adhesive setting and bonding part and less than the setting amount of a space of the adhesive setting and bonding part and the adhesive inflow allowing space combined, the adhesive is reliably set to the adhesive setting and bonding part, and the working fluid is prevented from leaking outward due to lack of adhesive. Further, since the adhesive inflow allowing space is arranged between the adhesive setting and bonding part and the space region on the open end side, even if the adhesive flows into the adhesive inflow allowing space, the working fluid is reliably prevented from leaking into the space region on the open end side, and thus the opening of the circular communication path is prevented from being blocked etc. by the leakage of the adhesive into the space region of the open end side.

One aspect of the invention is that the adhesive inflow allowing space is formed by a groove depressed across the entire circumference of the respective joining faces in at least the cover or the sleeve.

Therefore, by forming the adhesive inflow allowing space across the entire circumference, the adhesive overflowed from the adhesive setting and bonding part reliably flows into the adhesive inflow allowing space, and the adhesive is reliably prevented from leaking out into the space region on the open end side. The adhesive inflow allowing space can be easily and inexpensively manufactured with a simple configuration by being configured with a groove formed in the cover and the sleeve.

A further aspect of the invention is that a communication part is formed for communicating the space region on the open end side between the cover and the sleeve and the adhesive inflow allowing space and allowing the working fluid to flow into the adhesive inflow allowing space.

According to this configuration, when filling the working fluid into the space in the sleeve including the space between the cover and the sleeve after a step of bonding the cover and the sleeve, the working fluid is filled through the communication part into a space to where the adhesive did not flow into in the adhesive inflow allowing space. Thus, as the working fluid is not filled, in a subsequent step of filling the working fluid, into a space to where the adhesive did not flow into in the adhesive inflow allowing space when the adhesive is set, the air is prevented from entering therein. Therefore, a disadvantage of the working fluid in the inner part leaking outward when the air enters the adhesive inflow allowing space and expands in rise in temperature is prevented from occurring according to the above configuration.

A still further aspect of the invention is that the circular communication path is formed at a position proximate to the open end of the sleeve with respect to a bearing axis direction than an inside surface of the cover facing the space region on the open end side to create a step between the inside surface of the cover and the communication part.

According to this configuration, even if air bubbles are mixed in the working fluid circulated and flowed into the space region on the open end side from the circular communication path, and such air bubbles tend to move along the inside surface of the cover in the space region on the open end side, the air bubbles are prevented from flowing into the communication part along the inside surface of the cover facing the space region on the open end side due to a step created between the inside surface of the cover and the communication part.

Another aspect of the invention is that collars are formed at the respective cover and sleeve around the entire circumference of the outer periphery side so as to face each other, the end face of the peripheral wall forming the adhesive inflow allowing space and the end face of the sleeve on its open end side are contacted to each other for positioning such that a clearance is formed between the collars, which clearance contacts the end faces of the cover and the sleeve to each other, and the adhesive is fed and set between the collars to configure the adhesive setting and bonding part.

Thus, the relatively large amount of adhesive is set between the collars serving as the adhesive setting and bonding part, and even if the relative position between the collars of the cover and the sleeve changes due to temperature variation and the like, such change is absorbed by the adhesive having a thickness of a certain extent, and the reliability of the location joined by the adhesive can be enhanced.

Another aspect of the invention is that the setting amount of the adhesive is greater than the capacity of the adhesive setting and bonding part and less than the capacity of the capacity of the adhesive inflow allowing space and the capacity of the adhesive setting and bonding part combined, and thus the adhesive does not lack, and the adhesive is prevented from leaking out into the bearing.

Another aspect of the invention is that an introducing minimum clearance part for causing capillary phenomenon is formed to extend to the open end of the bearing hole from a location in a proximity of the opening of the circular communication path in the space region on the open end side between the cover and the sleeve, so that the working fluid from the circular communication path flows into the bearing hole of the sleeve due to the capillary phenomenon, a vent hole leading to an outside air is formed at a location not formed with the introducing minimum clearance part of the cover, and a fluid storage space for storing the working fluid is formed by being depressed so as to become a space larger than the clearance of the introducing minimum clearance part at the inside surface part of the cover facing the end face on the open end side of the sleeve, thereby to communicate the introducing minimum clearance part and the vent hole in the circumferential direction.

According to this configuration, even if the working fluid of the fluid storage space decreases due to evaporation and the like, the circulating function can be maintained as long as the introducing minimum clearance part is filled with the working fluid. Thus, the bearing performance can be satisfactorily maintained over an extremely long period of time, longer operating life is achieved and the adhesive is reliably prevented from flowing into the introducing minimum clearance part since the adhesive inflow allowing space is arranged.

According to the hydrodynamic bearing device of the invention, since the adhesive inflow allowing space is formed between the adhesive setting and bonding part and the space region on the open end side to allow the adhesive from the adhesive setting and bonding part to flow in, the adhesive is reliably set to the adhesive setting and bonding part, the working fluid is prevented from leaking outward due to lack of adhesive, and the opening of the circular communication path is prevented from being blocked by the leakage of the adhesive into the space region on the open end side, and the reliability can be enhanced.

Further, since the adhesive inflow allowing space is formed across the entire circumference of the joining surfaces of the cover and the sleeve the adhesive overflowed from the adhesive setting and bonding part reliably flows into the adhesive inflow allowing space, and thus the adhesive is prevented from leaking outward into the space region on the open end side. Further, the adhesive inflow allowing space can be easily and inexpensively manufactured by being configured by a groove formed in the cover and the sleeve.

By forming the communication part for communicating the space region on the open end side between the cover and the sleeve and the adhesive inflow allowing space, the working fluid flows into a space through the communication part to where the adhesive did not flow into in the adhesive inflow allowing space when filling the working fluid after the step of bonding the cover and the sleeve, and the air is prevented from entering. Consequently, the working fluid is prevented from leaking outward by the expansion of air in temperature rise due to entering of the air into the adhesive inflow allowing space.

The communication part is formed at a position closer to the open end of the sleeve with respect to the bearing axis direction than the inside surface of the cover facing the space region on the open end side, and a step is created between the inside surface of the cover and the communication part, and thus even if the air bubbles from the circular communication path flow into the space region on the open end side, the air bubbles are prevented from flowing into the communication part along the inside surface of the cover, and thus the working fluid is prevented from flowing outward by the expansion of air in temperature rise.

The hydrodynamic bearing device of the invention is particularly suitable as a spindle motor of, for example, a disc driving device, a reel driving device, a capstan driving device, and a drum driving device, but is not limited thereto.

DESCRIPTION OF THE PREFERRED EMBODIMENTS

A hydrodynamic bearing device according to the preferred embodiments of the invention will now be described based on the drawings. In the embodiments, a case in which the hydrodynamic bearing device is used in the spindle motor of the hard disc drive will be explained.

First Embodiment

Figure 1:
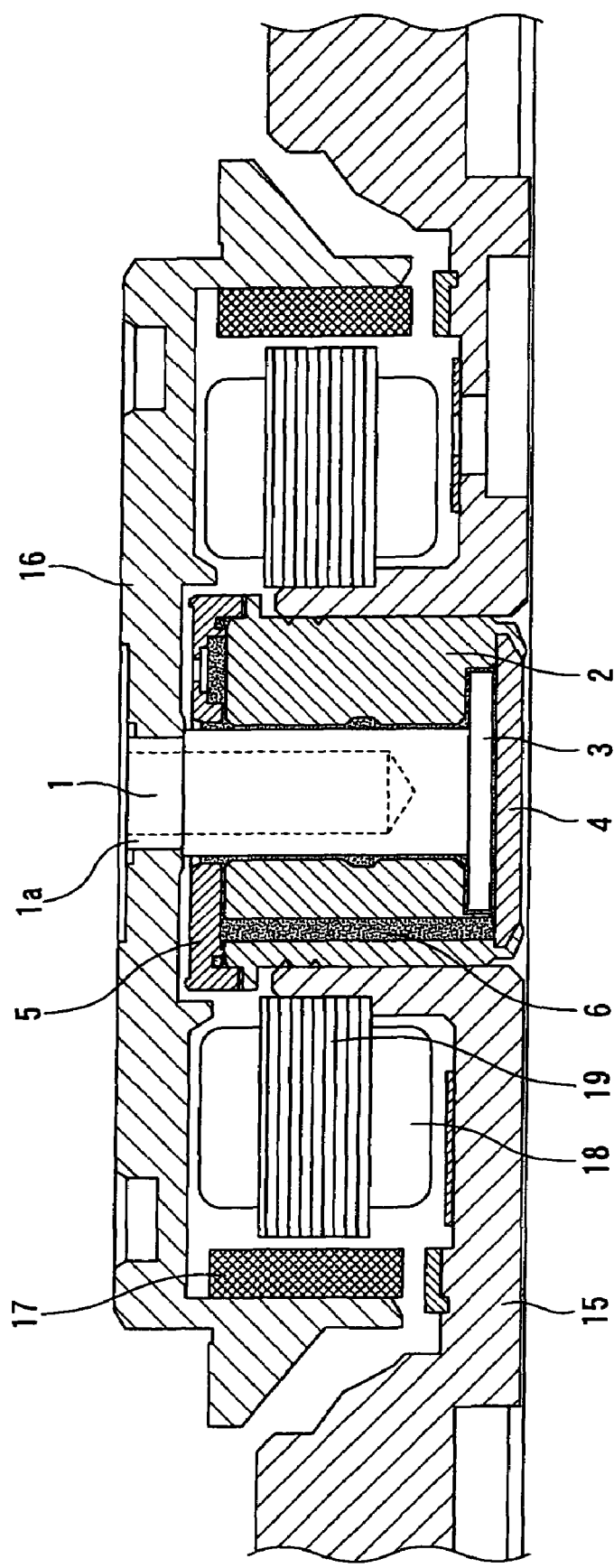
FIG. 1 is a cross sectional view of a spindle motor equipped with a hydrodynamic bearing device according to a first embodiment of the invention.
Figure 2A:
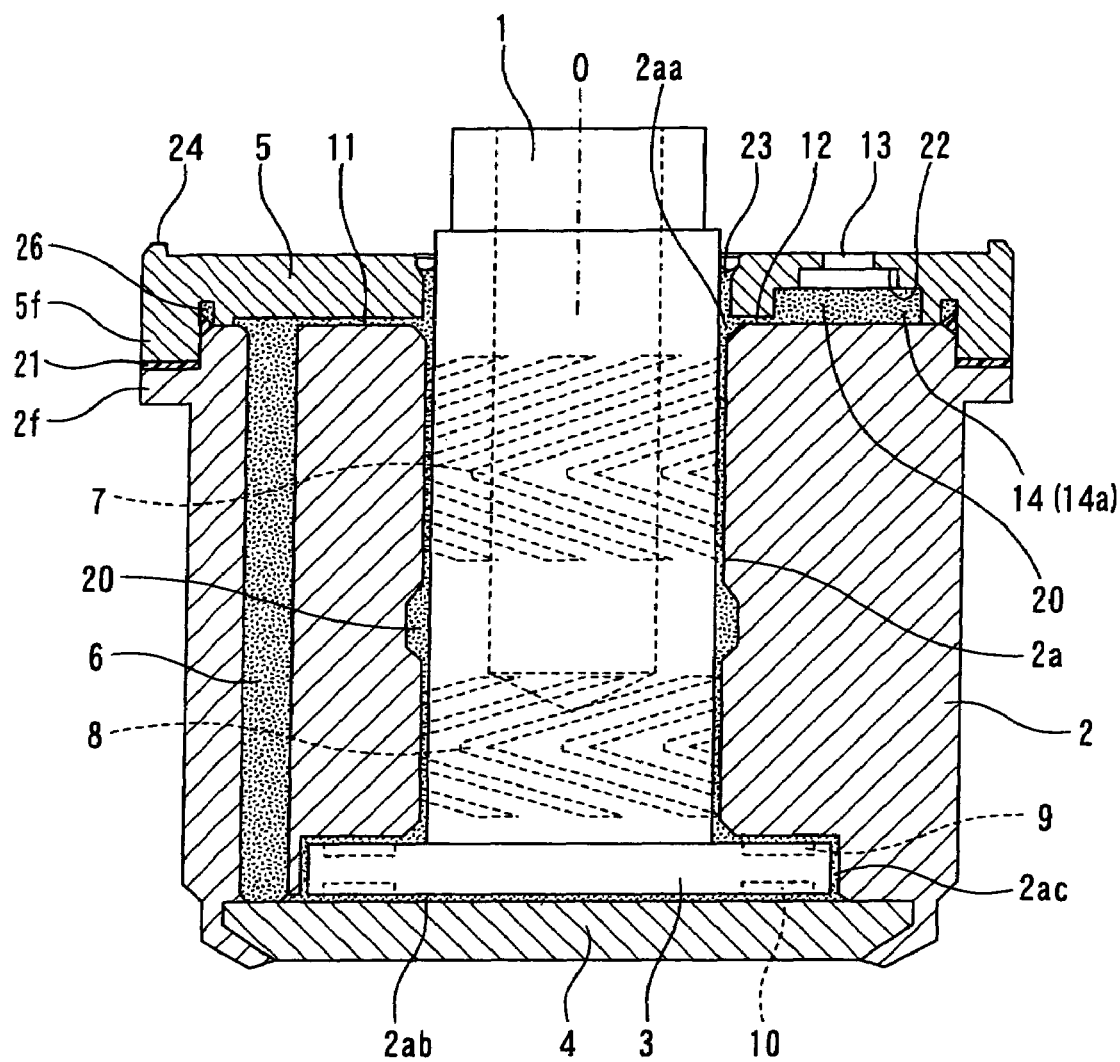
FIG. 2A is a cross sectional view of the hydrodynamic bearing device.
Figure 2B:
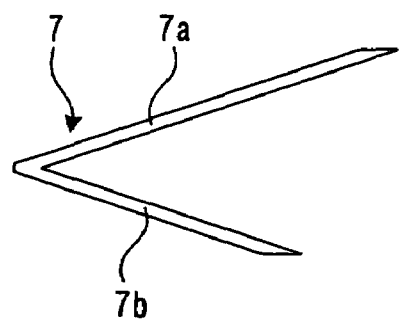
FIG. 2B is a view showing one dynamic pressure generating groove of the hydrodynamic bearing device.
Figure 3:
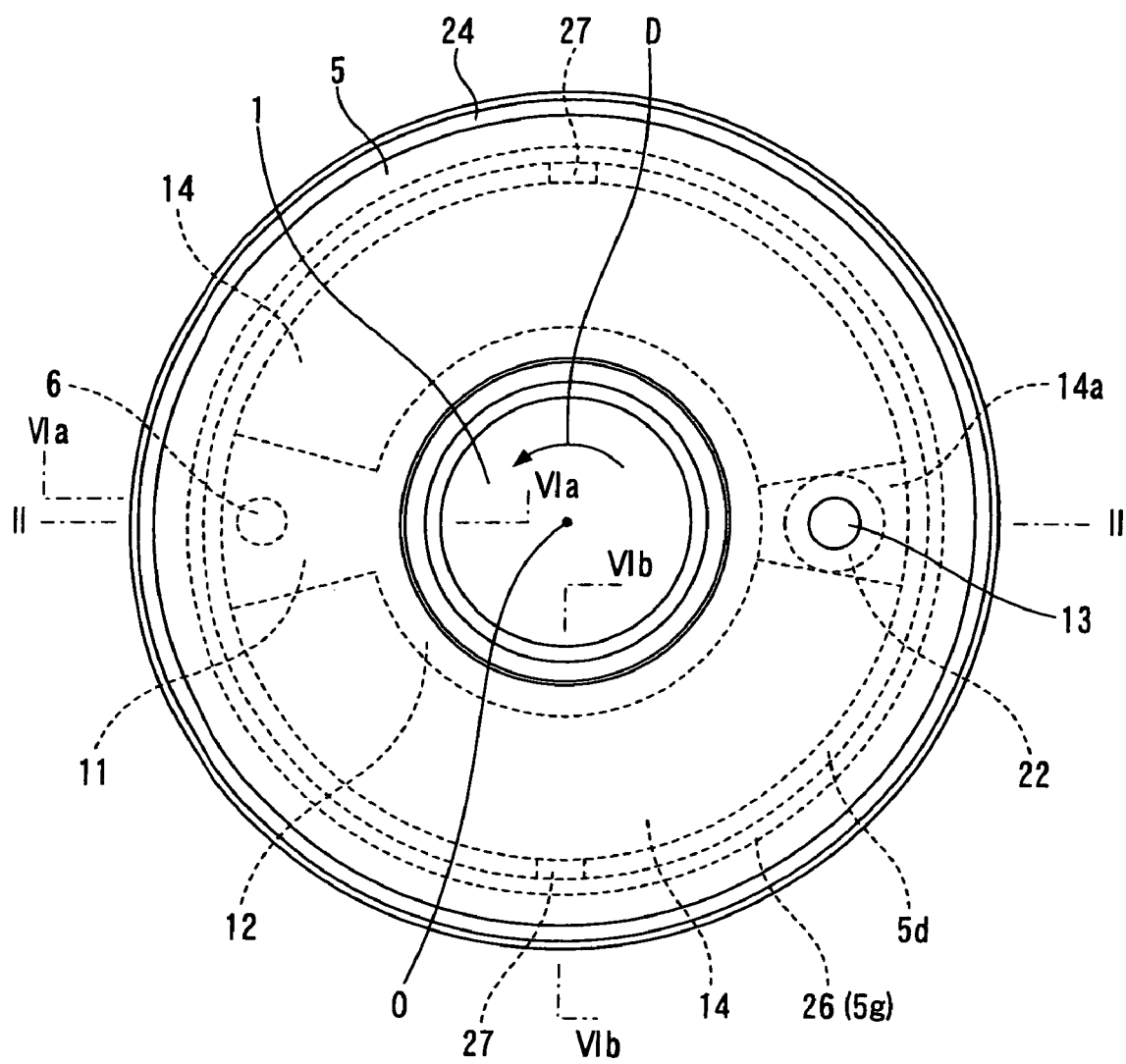
FIG. 3 is a plan view of the hydrodynamic bearing device.

FIG. 1 is a cross sectional view of a spindle motor equipped with a hydrodynamic bearing device according to a first embodiment of the invention, FIG. 2A is a cross sectional view of the hydrodynamic bearing device, FIG. 3 is a plan view of the hydrodynamic bearing device. In the following description, a case in which an open end of a bearing hole of the sleeve is arranged upward and a close end is arranged downward, as shown in FIG. 1 and FIG. 2, is explained for easy understanding, but in actual use, the arrangement is of course not limited thereto.

As shown in FIG. 1 to FIG. 3, the hydrodynamic bearing device of the spindle motor includes a shaft 1, a sleeve 2, fixed to the base 15 of the spindle motor, including a bearing hole 2a with an open end 2aa on the upper side that opens and a close end 2ab on the lower side that is closed, and having the shaft 1 inserted therein in a freely rotating fashion via a gap (space) in between, a thrust flange 3 of thick diameter fixed to the lower end of the shaft 1 with an external fit coupling, a screw and the like, and arranged at the thick diameter hole part 2ac on the close end side of the bearing hole 2a in an orientation that includes a gap with respect to the thick diameter hole part 2ac, and a thrust plate 4 fixed at the bottom part of the sleeve 2 so as to face the lower surface of the thrust flange 3 with a gap therebetween. In addition to this configuration, a cover 5 is arranged for covering the upper end face (end face on the open end side) of the sleeve 2 in an orientation that includes a space. The cover 5 includes one vent hole 13 leading to outside air. In the hydrodynamic bearing device, one circular communication path 6 (e.g., diameter of between about 0.2 mm and 0.6 mm) extending parallel to the bearing axis O is perforated at a location closer to the outer peripheral surface of the sleeve 2. The circular communication path 6 communicates the thick diameter hole part 2ac (space region on the close end face side) arranged on the close end 2ab side of the bearing hole 2a and the space region (referred to as space region on the open end side) between the cover 5 and the upper end face or the end face on the open end (2aa) side of the sleeve 2.

The working fluid 20 (ester oil is mainly used, but grease or ionic solution having satisfactory fluidity may be used) such as, lubricating oil is filled into the space of the inner part of the sleeve 2 including the space between the cover 5 and the sleeve 2 (i.e., space between the outer peripheral surface of the shaft 1 and the inner peripheral surface of the sleeve 2, space in the thick diameter hole part 2ac of the bearing hole 2a, space of the communicating locations between the thick diameter hole part 2ac of the bearing hole 2a and the circular communication path 6, space within the circular communication path 6, and the space region on the open end side between the upper end face of the sleeve 2 and the cover 5 (provided that location of vent hole 13 is excluded)). It is to be noted that, as shown enlarged in FIG. 2, a working fluid storing part 23 for storing the working fluid 20 in communication with the outside air is formed so as to widen toward the open side in the inner peripheral surface of the cover 5 facing the shaft 1. The sleeve 2 and the cover 5 are fixed with an adhesive 21

The materials used are as follows: the shaft 1 is made of stainless metal; the sleeve 2 is made of copper metal or that performed with nickel metal plating, or stainless metal; the thrust flange 3 is made of stainless metal, the thrust plate is made of stainless metal or cemented carbide; and the cover 5 is entirely or partially made of resin. Epoxy is mainly used for the adhesive.

Two dynamic pressure generating grooves 7 and 8 of herringbone pattern etc. are formed one above the other on the inner peripheral surface of the sleeve 2 (or outer peripheral surface of the shaft 1 or on both the inner peripheral surface of the sleeve 2 and the outer peripheral surface of the shaft 1) and the radial hydrodynamic bearing is configured in which, when the shaft 1 and the sleeve 2 are relatively rotated by the rotational driving force to be hereinafter described, the shaft 1 and the sleeve 2 are supported in a freely rotating manner through a predetermined gap in the radial direction (direction of radius) by the force of the working fluid 20 collected by the dynamic pressure generating grooves 7 and 8. The dynamic pressure generating grooves 9 and 10 of spiral pattern etc. are formed on the upper surface and the lower surface of the thrust flange 3 (or arranged on the lower surface of the sleeve 2 or upper surface of the thrust plate 4 facing thereto, or on all of the upper and lower surfaces of the thrust flange 3, the lower surface of the sleeve 2, and the upper surface of the thrust plate 4) and the thrust hydrodynamic bearing is configured in which, when the thrust flange 3 attached to the shaft 1 and the sleeve 2 are relatively rotated by the rotational driving force, the shaft 1 and the sleeve 2 are supported in a freely rotating manner through a predetermined gap in the thrust direction (direction of bearing axis) by the force of the working fluid 20 collected by the dynamic pressure generating grooves 9 and 10. The dynamic pressure generating grooves 7 and 8 configuring the radial hydrodynamic bearing are formed into a well-known herringbone shape, and are formed at a total of two locations on the upper side and the lower side of the outer peripheral surface of the shaft 2. The dynamic pressure generating groove 8 on the lower side has the groove inclining upward from the vertex and the groove inclining downward from the vertex made into the same length, whereas the dynamic pressure generating groove 7 on the upper side has the groove 7a inclined upward from the vertex formed longer than the groove 7b inclined downward from the vertex, as shown in FIG. 2B. During rotational drive, the working fluid 20 of the clearance is actively sent out downward by the dynamic pressure generating groove 7 on the upper side.

As shown in FIG. 1, the hub 16 serving as a rotating member, on which outer periphery a magnetic recording disc and the like is fixed, is externally fitted to a projecting shaft part 1a of the shaft 1 projecting out from the bearing hole 2a of the sleeve 2 in a press-fit state. In the first embodiment, the rotor magnet 17 is attached to the outer periphery of the part closer to the base of the hub 16. The stator core 19 wrapped with stator coil 18 is attached to the base 15 so as to face the rotor magnet 17. The rotor magnet 17 and the stator core 19 configure the rotational driving part of the spindle motor that supplies rotational driving force to between the shaft 1 and the sleeve 2.

Figure 4:
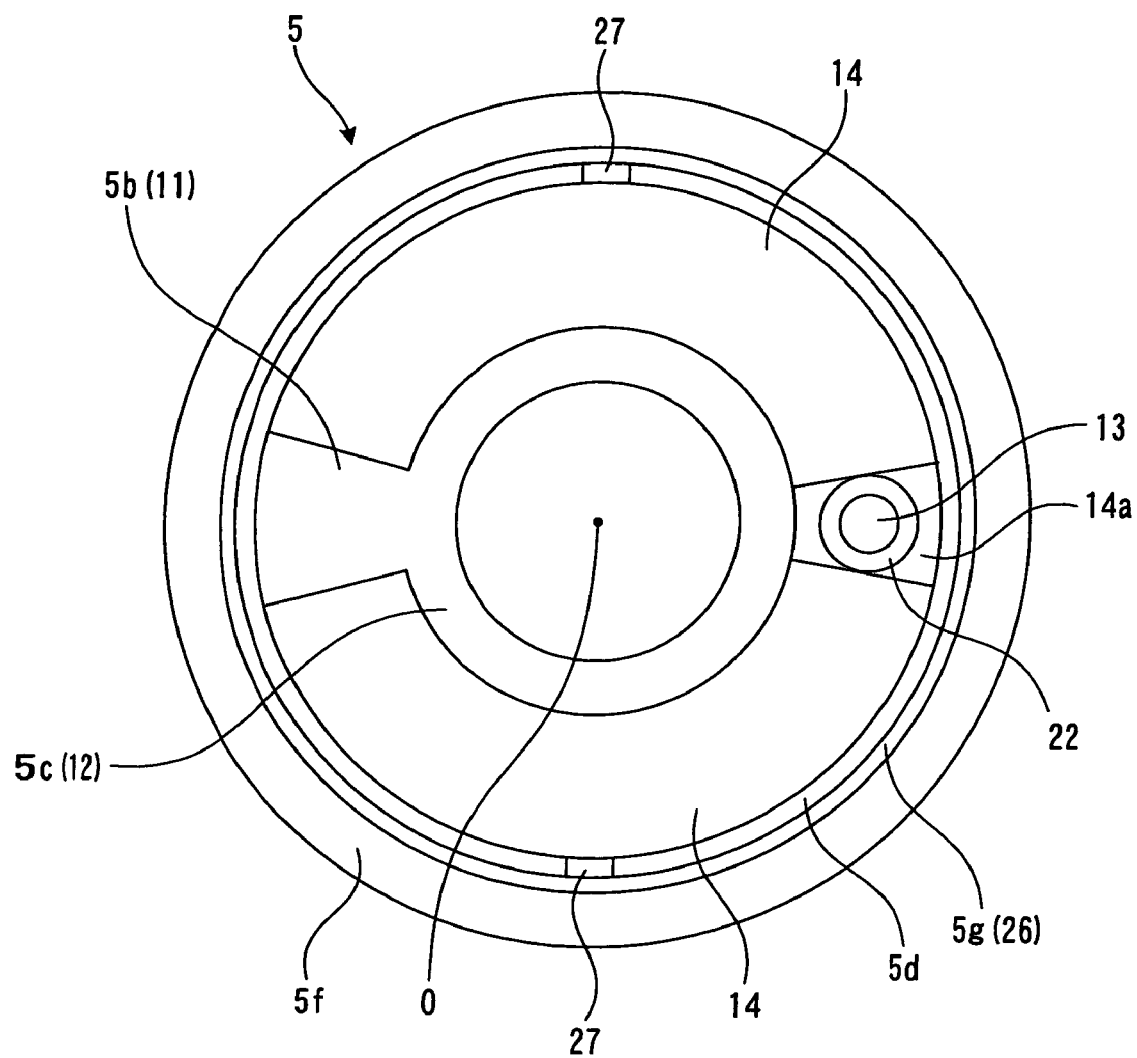
FIG. 4 is a view of the cover of the hydrodynamic bearing device seen from the inside surface.
Figure 5:
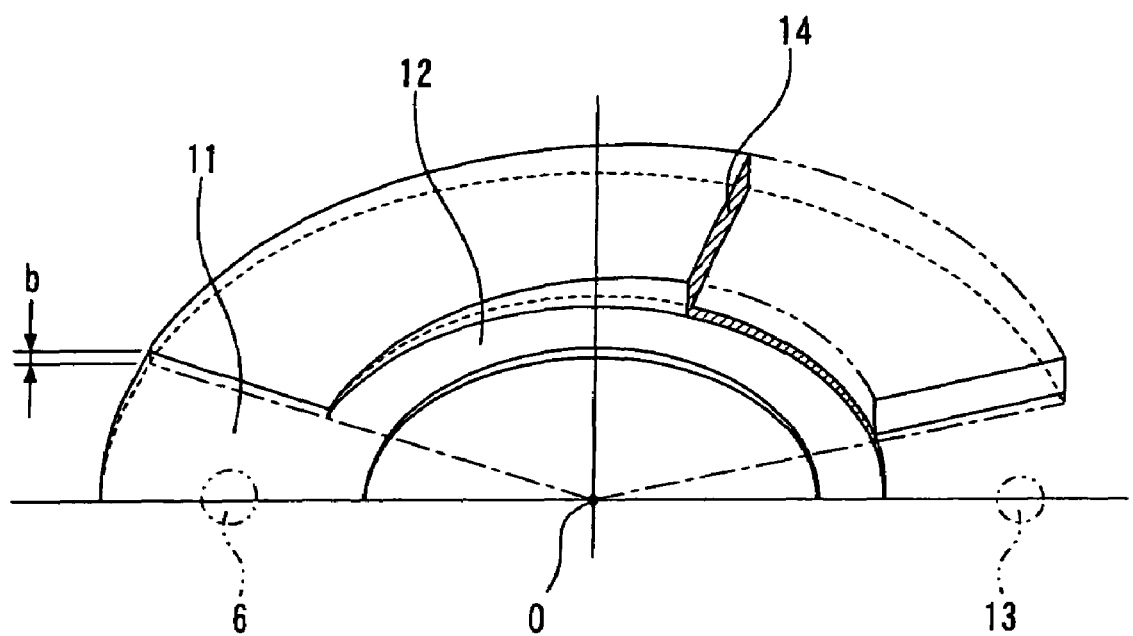
FIG. 5 is a perspective view schematically showing a separating space of the inside surface part of the cover and an upper end face of the sleeve facing thereto of the hydrodynamic bearing device.

As shown in FIG. 2A, the upper end face of the sleeve 2 facing the cover 5 is substantially planar. On the contrary, as shown in FIG. 2A and FIGS. 3 to 5 (in FIG. 5, the separating space between an inside surface part of the cover 5 and the upper end face of the sleeve 2 facing thereto is schematically shown for easy understanding), the cover 5 has the inside surface part arranged so that the region in the proximity of the opening of the circular communication path 6 that opens to the upper end face of the sleeve 2 and the outer periphery part of the open end of the bearing hole 2a of the sleeve 2 have dimension b (refer to FIG. 5) in which the separating distance between the inside surface part of the cover 5 and the upper end face of the sleeve 2 facing thereto causes capillary phenomenon, and clearances that allows the fluid to flow into the bearing hole 2a of the inner peripheral surface of the sleeve 2 by the capillary phenomenon (each referred to as introducing minimum clearance part 11, and bearing hole outer peripheral minimum clearance 12, and in FIG. 4, the introducing minimum clearance surface 5b facing the introducing minimum clearance part 11 of the inside surface part of the cover 5, and the bearing hole outer peripheral minimum clearance surface 5c facing the bearing hole outer periphery minimum clearance 12 are shown) are formed. The introducing minimum clearance part 11, as shown in FIG. 3 and FIG. 4, is formed so as to continue from the location in the proximity of the opening of the circular communication path 6 to the open end of the bearing hole 2a of the sleeve 2 by way of the bearing hole outer periphery minimum clearance 12. In the first embodiment, the bearing hole outer periphery minimum clearance 12 has a substantially fan shape with an opening angle of about 30°, and is formed over a region wider than the opening of the circular communication path 6. The diameter of the open end of the bearing hole 2a of the upper end face of the sleeve 2 is for example, between 2.8 mm and 3.2 mm, and the bearing hole outer periphery minimum clearance surface 5c is a toric shape formed with a dimension of the width in the radius direction of between 0.2 to 0.6 mm from the outer periphery of the open end of the bearing hole 2a. The separating clearance between the introducing minimum clearance part 11 and the bearing hole outer periphery minimum clearance 12 is for example, between 0.03 mm and 0.15 mm. In the first embodiment, the separating clearance between the introducing minimum clearance part 11 and the bearing hole outer periphery minimum clearance 12 is constant with respect to the radial direction.

Particularly, the locations other than the introducing minimum clearance part 11 and the bearing hole outer periphery minimum clearance 12 on the inside surface of the cover 5 is depressed so as to become a space larger than the clearances of the introducing minimum clearance part 11 and the bearing hole outer periphery minimum clearance 12 to form a fluid storage space 14 that stores the working fluid 20 so as to communicate the introducing minimum clearance part 11 and the vent hole 13 in the circumferential direction. The fluid storage space 14 has for example, an inner diameter of between 3.2 mm and 3.8 mm, an outer diameter of between 5.5 mm and 6.3 mm, a minimum clearance of between 0.03 mm and 0.15 mm, and a maximum clearance of between about 0.2 mm and 0.3 mm. The vent hole 13 has the diameter of between about 0.2 mm and 1.0 mm and the like, and a concave part 22 (e.g., diameter of between 0.6 mm and 1.0 mm, depth of between about 0.1 mm and 0.3 mm) serving as a buffer space formed by a spot faced hole is formed at the location where the vent hole 13 is arranged. However, the location of the fluid storage space 14 (referred to as maximum space 14a) that continues into the vent hole 13 and the concave part 22 is formed into a shape inclined with respect to the circumferential direction so that the separating distance with respect to the upper end face of the sleeve 2 becomes the largest, and the separating distance from the upper end face (end face on the open end side) of the sleeve 2 becomes larger toward the maximum space 14a from the introducing minimum clearance part 11. In the first embodiment, the separating clearance of the fluid storage space 14 is constant with respect to the radial direction. Further, in the first embodiment, the vent hole 13 communicating to the outside air is arranged at a location of the cover 5 opposite the opening of the circular communication path 6 with the bearing axis O as the center when seen in planar. D in FIG. 3 is the rotating direction of the shaft 1. By forming the concave part 22 in the vent hole 13, even if rise in temperature and the like of the installing environment of the hydrodynamic bearing device occurs with the working fluid 20 filled to its fullest, the interface of the working fluid 20 stays within the concave part 22, and thus the working fluid 20 does not leak out from the vent hole 13.

As shown as an enlarged view in FIG. 6, the working fluid storing part 23 formed so as to become wider toward the open side at the inner peripheral surface of the cover 5 facing the shaft 1 includes an inclined surface inclined so as to narrow downward, and is set to a shape so that even when the position of the interface at the location of the fluid storage space 14 is changed by reduction of the working fluid 20 through evaporation and the like, the interface is balanced within a moving range in the inclined surface of the working fluid storing part 23.

As shown in FIG. 2A and FIG. 3, a protruding part 24 that protrudes upward is formed on the outer periphery part of the upper surface of the cover 5 to prevent the working fluid 20 from falling outward when lubricating the working fluid 20 after assembling the hydrodynamic bearing device. The protruding part 24 has for example, an inner diameter of between 6 mm and 8 mm and a height of between about 0.03 mm and 0.1 mm.

Figure 6A:
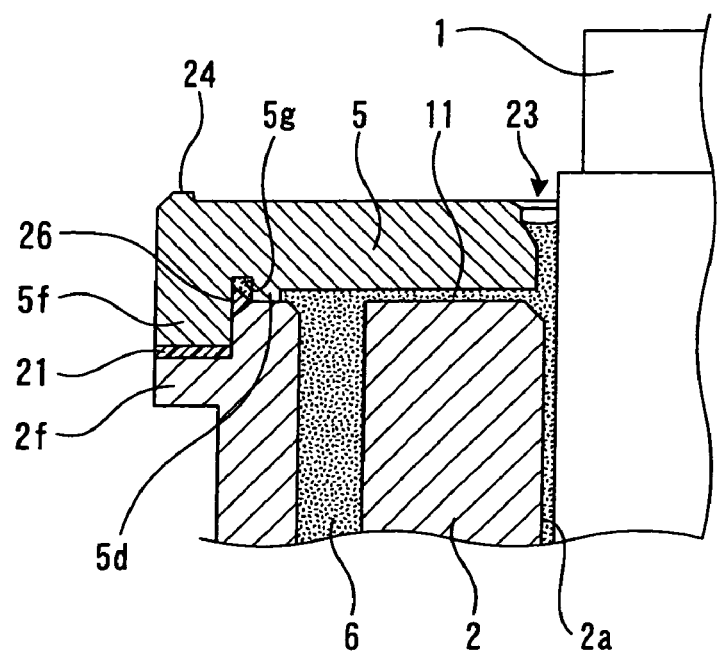
FIG. 6A is a cross sectional view of the main part of the hydrodynamic bearing device taken along line VIa-VIa of FIG. 3.
Figure 6B:
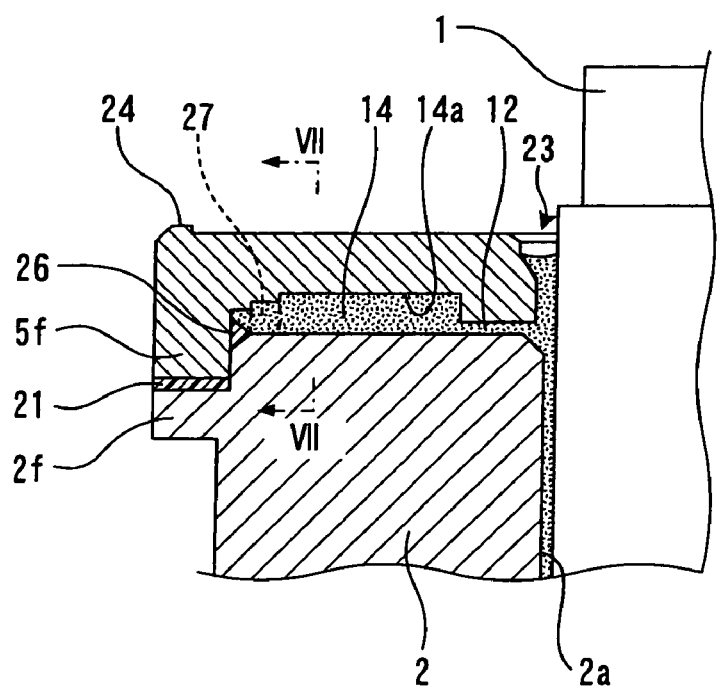
FIG. 6B is a cross sectional view of the main part of the hydrodynamic bearing device taken along line VIb-VIb of FIG. 3.

In addition to the above configuration, the invention particularly includes, as shown in FIG. 6A and FIG. 6B, a collar 2f projecting outward and integrally formed across the entire circumference of the outer periphery of the upper part of the sleeve 2, and in correspondence thereto, a collar 5f extending downward and integrally formed across the entire circumference of the outer periphery of the cover 5 so as to face the collar 2f of the sleeve 2 from above. The sleeve 2 and the cover 5 are bonded with the adhesive 21 by way of the respective collars 2f and 5f, and the clearance between the collars 2f and 5f functions as an adhesive setting and bonding part. The position regulation in the axial direction of the sleeve 2 and the cover 5 is performed when the peripheral wall 5d configuring the outer peripheral wall of the introducing minimum clearance part 11 and the fluid storage space 14 in the cover 5 contacts the outer peripheral part of the upper end face of the sleeve 2 from above. The collar 2f of the sleeve 2 and the collar 5f of the cover 5 are formed so as to create a predetermined clearance in the axial direction to allow a relatively large amount of adhesive 21 to be filled therebetween. Thus, the adhesive function at the location joined by the adhesive 21 is satisfactorily maintained even when temperature variation occurs at the installing location of the hydrodynamic bearing device.

A groove 5g depressed upward across the entire circumference of the lower surface of the cover 5 is formed at the location between the location where the collars 2f and 5f serving as the adhesive setting and bonding part are arranged and the location of the introducing minimum clearance part 11 and the fluid storage space 14 filled with the working fluid 20, that is, at the location on the outer periphery of the peripheral wall 5d of the cover 5 in the present embodiment. The space in the groove 5g is an adhesive inflow allowing space 26 that allows the adhesive 21 from between the collars 2f and 5f to flow in.

Figure 7:
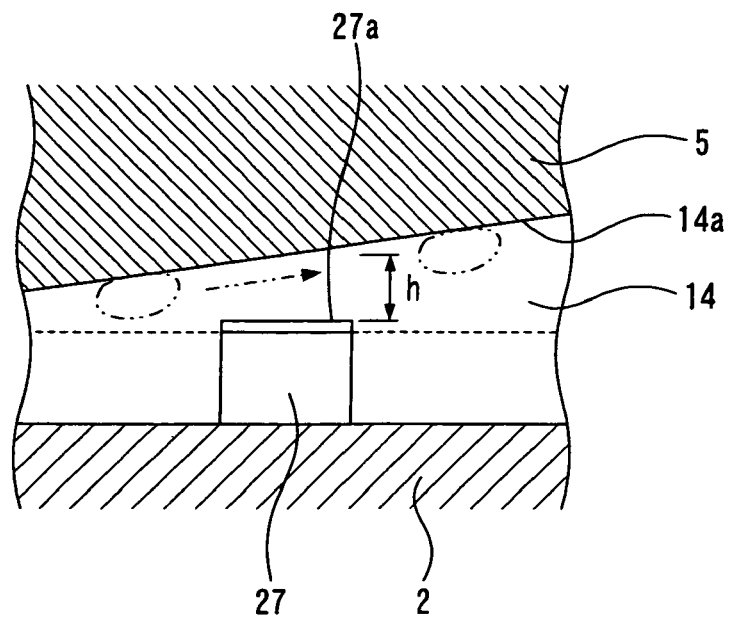
FIG. 7 is a cross sectional view of the main part of the hydrodynamic bearing device seen from line VII-VII of FIG. 6.

As shown in FIG. 3 and FIG. 4, one part of the peripheral wall 5d partitioning the fluid storage space 14 and the adhesive inflow allowing space 26 in the cover 5 is cut to form a communication part 27. The communication part 27, as shown in FIG. 6B and FIG. 7, is formed slightly below the upper surface wall 14a of the fluid storage space part 14 in the cover 5, and a step h is created between the upper surface wall 14a of the fluid storage space 14 serving as the inside surface of the cover 5 and the upper end 27a of the communication part 27 (refer to FIG. 7).

A step of fixing the cover 5 to the sleeve 2 with the adhesive and subsequently a step of filling the working fluid 20 of the hydrodynamic bearing device arranged in the spindle motor will now be described.

Figure 8:
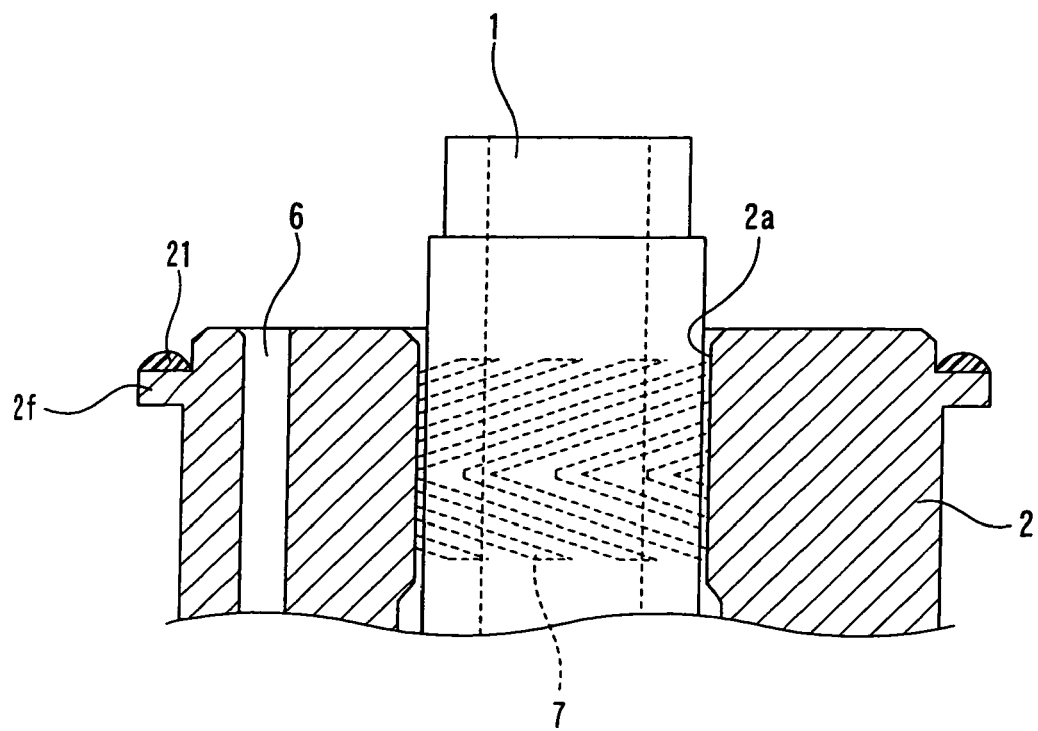
FIG. 8 is a cross sectional view showing a state applied with adhesive of the hydrodynamic bearing device.
Figure 9:
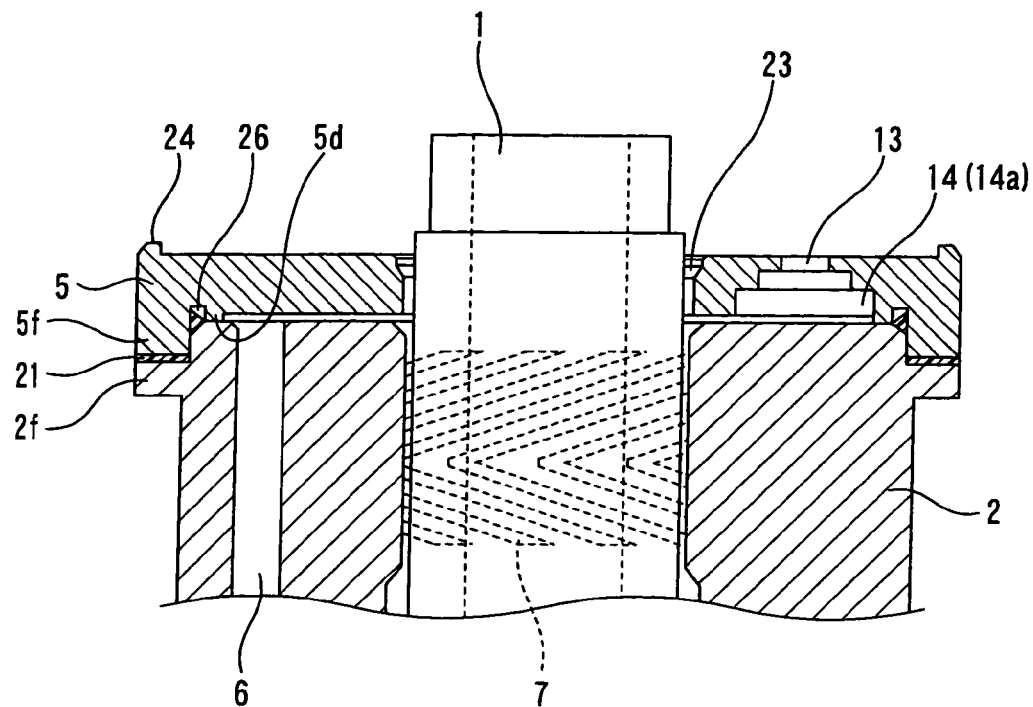
FIG. 9 is a cross section view showing a state placed with the cover of the hydrodynamic bearing device.

As shown in FIG. 8, the adhesive 21 is applied on the collar 2f of the sleeve 2, and thereafter, the cover 5 is placed over the sleeve 2, as shown in FIG. 9. The setting amount of the adhesive 21 to the collar 2f of the sleeve 2 is greater than the capacity between the collar 2f of the sleeve 2 and the collar 5f of the cover 5, that is, the capacity of the adhesive setting and bonding part. By setting the adhesive 21 in a large amount, one part of the adhesive 21 also flows into the adhesive inflow allowing space 26 through the clearance between the collar 5f of the cover 5 and the outer peripheral surface of the sleeve 2, but here, the setting amount is set so that the adhesive 21 flowing into the adhesive inflow allowing space 26 is slightly less than the capacity of the adhesive inflow allowing space 26.

Therefore, when the cover 5 is placed over the sleeve 2, the adhesive 21 is reliably set to the adhesive setting and bonding part, that is, the clearance between the collar 2f of the sleeve 2 and the collar 5f of the cover 5 across the entire circumference, and thus the working fluid 20 is reliably prevented from leaking outside due to lack of adhesive 21. Further, since the adhesive inflow allowing space 26 is arranged between the adhesive setting and bonding part and the space region on the open end side (fluid storage space 14 and introducing minimum clearance part 11), the adhesive 21 may flow into one part of the adhesive inflow allowing space 26 but is reliably prevented from leaking out into the fluid storage space 14 and the introducing minimum clearance part 11. Therefore, the adhesive 21 is prevented from flowing into the introducing minimum clearance part 11, and the opening of the circular communication path 6 is prevented from being blocked by the adhesive 21 caused by the above flow of the adhesive into the introducing minimum clearance part 11. Since the adhesive 21 flows into only one part of the adhesive inflow allowing space 26, the remaining space is in an empty state. The shaft 1 and the thrust flange 3 are assembled to the sleeve 2 in advance before the cover 5 is bonded to the sleeve 2, but may be assembled after the cover 5 is bonded to the sleeve 2.

Figure 10:
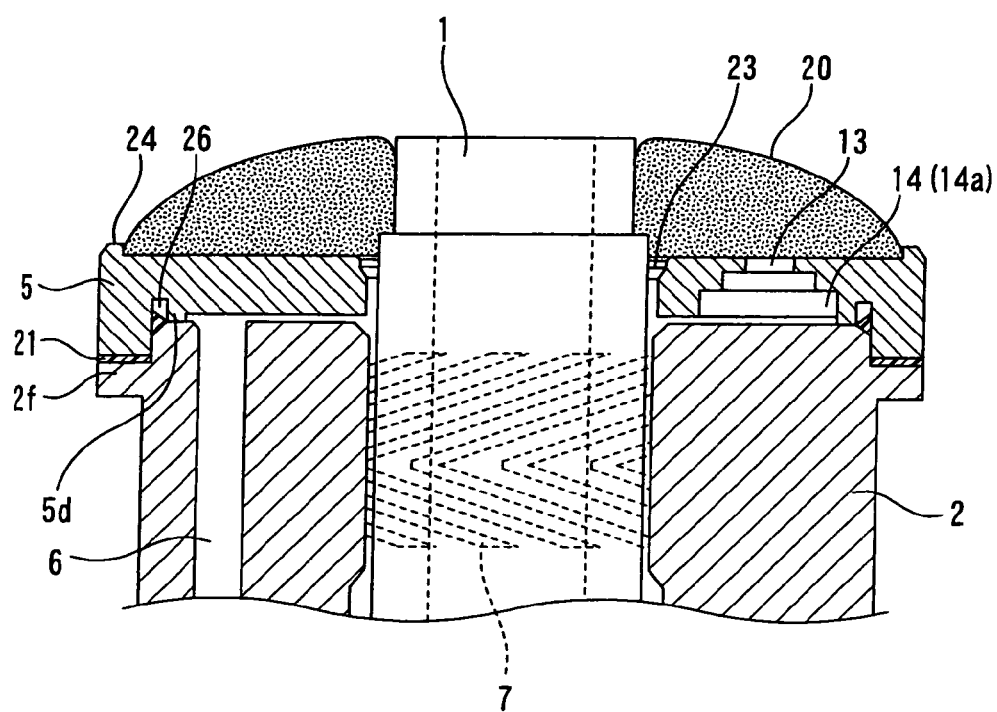
FIG. 10 is a cross sectional view showing a state supplied with working fluid of the hydrodynamic bearing device.

Subsequently, the sleeve 2 assembled with the cover 5, the shaft 1 and the like is conveyed into a vacuum chamber in which air is evacuated, and the working fluid 20 is dropped onto the cover 5, as shown in FIG. 10. By introducing the outside air into the vacuum chamber thereafter, the working fluid 20 is filled to the inner part of the hydrodynamic bearing device. In this case, since one part of the peripheral wall 5d partitioning the fluid storage space 14 and the adhesive inflow allowing space 26 in the cover 5 is cut to form the communication part 27, when introducing the outside air to the vacuum chamber and filling the working fluid 20 into the sleeve 2 and in between the sleeve 2 and the cover 5, the working fluid 20 introduced into the fluid storage space 14 passes through the communication part 27 and also fills a space in the adhesive inflow allowing space 26 where the adhesive 21 did not flow into (refer to FIG. 2, FIG. 6A, FIG. 6B). Therefore, the air is prevented from entering the space in the adhesive inflow allowing space 26 where the adhesive 21 did not flow into when the adhesive 21 is set, and the working fluid 20 is satisfactorily filled into the sleeve 2 and in between the sleeve 2 and the cover 5. Therefore, a disadvantage such as the working fluid 20 leaking outside due to expansion of air in temperature rise caused by the air entering the adhesive inflow allowing space 26 is prevented.

In the above configuration, when the shaft 1 and the sleeve 2 are relatively rotated by the rotational driving force of the spindle motor, the shaft 1 is supported with respect to the sleeve 2 with a predetermined gap in between by the force of the working fluid 20 collected by the dynamic pressure generating grooves 7 and 8 of the radial hydrodynamic bearing and the force of the working fluid 20 collected by the dynamic pressure generating grooves 9 and 10 of the thrust hydrodynamic bearing. Further, the working fluid 20 between the shaft 1 and the sleeve 2 is fed downward by the force of the working fluid 20 collected by the dynamic pressure generating groove 7 on the upper side of the radial hydrodynamic bearing, and accompanied therewith, the working fluid 20 passes through the space between the thrust flange 3 and the sleeve 2, the space between the sleeve 2 and the thrust plate 4, the space within the circular communication path 6, the introducing minimum clearance part 11, and the bearing hole outer periphery minimum clearance 12 in such order, and again flows into the space between the shaft 1 and the sleeve 2, and the working fluid 20 is actively circulated through these spaces. One part of the working fluid 20 introduced from the circular communication path 6 to the introducing minimum clearance part 11 again flows into the space between the shaft 1 and the sleeve 2 through the bearing hole outer periphery minimum clearance 12 while also flowing into the fluid storage space 14.

Therefore, even when air bubbles are attached to the dynamic pressure generating grooves 7 and 8 of the radial hydrodynamic bearing or the dynamic pressure generating grooves 9 and 10 of the thrust hydrodynamic bearing, the air bubbles break away from the dynamic pressure generating grooves 7 and 8 and the dynamic pressure generating grooves 9 and 10 and circulate, and flow into the fluid storage space 14 of lower pressure when passing from the circular communication path 6 to the introducing minimum clearance part 11. When flowing into the fluid storage space 14 of lower pressure, the size of the air bubbles becomes rather large and thus is less likely to reenter the introducing minimum clearance part 11 and the bearing hole outer periphery minimum clearance 12 of high pressure, and thus the air bubbles are separated from the working fluid 20 at the fluid storage space 14 and exhausted from the vent hole 13.

According to such configuration, the air bubbles in the working fluid 20 are exhausted during a normal rotational drive, and as a result, lowering of bearing performance such as, lowering of bearing stiffness due to air bubbles and instability of the rotation during rotating operation can be prevented, and thus the reliability can be enhanced.

Further, according to such hydrodynamic bearing device, not only is the working fluid storing part 23 arranged on the inner peripheral surface of the cover 5 facing the shaft 1, but the fluid storage space 14 of large volume is also arranged between the sleeve 2 and the cover 5. Therefore, even if the working fluid of the fluid storage space 14 decreases, the circulating function can be maintained as long as the introducing minimum clearance part 11 and the bearing hole outer periphery minimum clearance 12 are filled with the working fluid 20.

According to the invention, in particular, the fluid storage space 14 is formed into an inclined shape with respect to the circumferential direction so that the separating distance from the upper surface or the end face on the open end side of the sleeve 2 becomes large towards the maximum space 14a where the vent hole 13 is provided from the introducing minimum clearance part 11, and thus even if the hydrodynamic bearing device is subjected to an external impact or the orientation is suddenly changed, the interface between the air and the working fluid 20 in the fluid storage space 14 remains at the location in the proximity of the vent hole 13 and is prevented from moving in the circumferential direction and as a result, the leakage of the working fluid 20 to the outside involved in the movement of the air bubbles is prevented.

The bearing hole outer periphery minimum clearance 12 that causes capillary phenomenon is formed on the outer periphery part in the proximity of the open end of the bearing hole in between the inside surface of the cover 5 and the upper surface of the sleeve 2, and thus the working fluid 20 introduced from the introducing minimum clearance part 11 is satisfactorily supplied to the bearing hole 2a of the sleeve 2 from the entire circumference by way of the bearing hole outer periphery minimum clearance 12, and the bearing hole 2a of the sleeve 2 is stably filled with the working fluid 20.

In the invention, the communication part 27 is, as shown in FIG. 6B, FIG. 7 and the like, formed slightly below the upper surface wall 14a of the fluid storage space 14 in the cover 5 and a step h is created between the upper surface wall 14a of the fluid storage space 14 or the inside surface of the cover 5 and the upper end 27a of the communication part 27 (refer to FIG. 7). Thus, even if the air bubbles from the circular communication path 6 flow into the fluid storage space 14 through the introducing minimum clearance part 11, and thereafter, the air bubbles K move along the upper surface wall 14a of the fluid storage space 14, as shown in FIG. 7 etc. the air bubbles are prevented from flowing into the communication part 27 by means of the step h. Therefore, the air bubbles are prevented from entering the adhesive inflow allowing space 26, and the disadvantage of the working fluid 20 flowing outward due to the expansion of air in temperature rise is prevented.

In the first embodiment, the protruding part 24 that protrudes upward is formed on the outer periphery part of the upper surface of the cover 5, and thus when lubricating the working fluid 20 after assembling the hydrodynamic bearing device, the working fluid 20 is prevented from flowing out from the upper surface of the cover 5 by the protruding part 24. The operating efficiency is thus enhanced and the filling amount of the working fluid 20 to the sleeve 2 is prevented from being reduced, thereby enhancing reliability.

Figure 11:
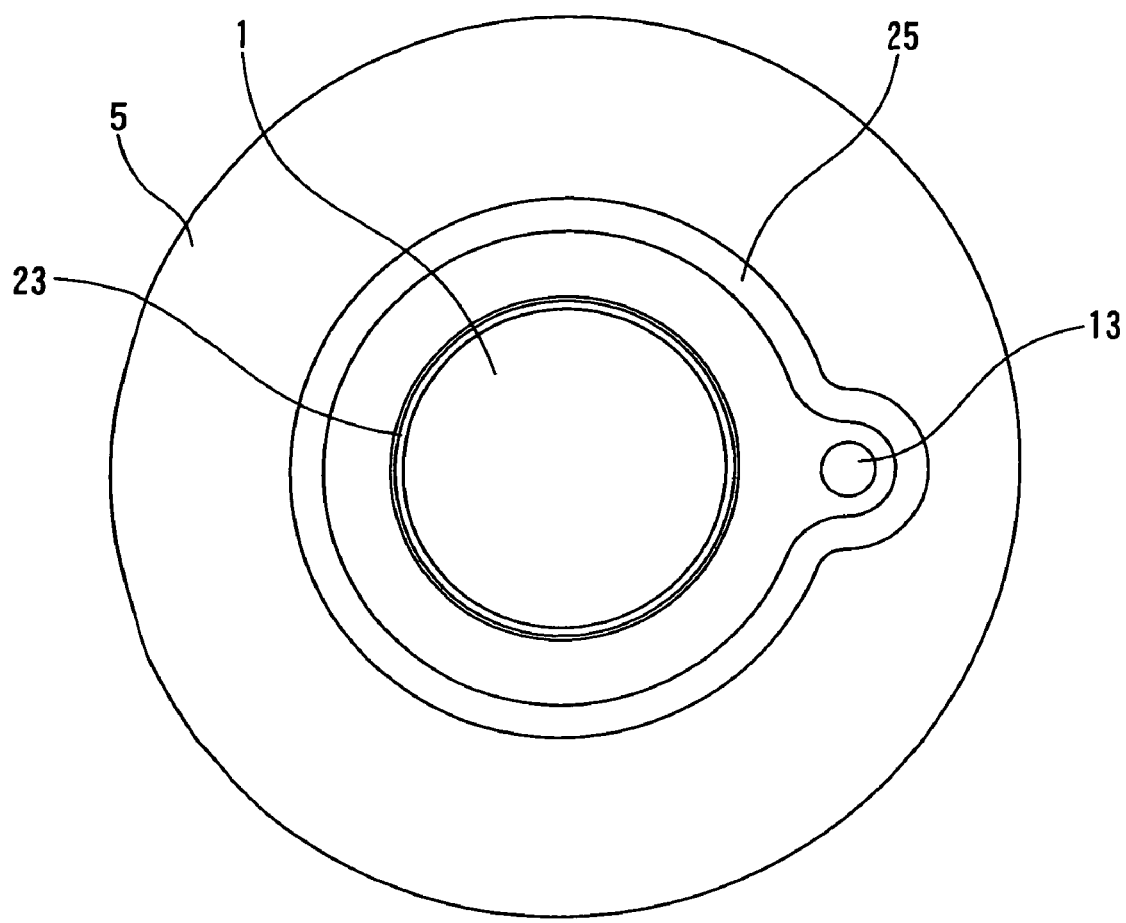
FIG. 11 is a plan view of the cover of the hydrodynamic bearing device according to another embodiment of the invention.

As shown in FIG. 11, instead of arranging the protruding part 24, a trench for oil barrier 25 for applying the oil barrier may be formed so as to surround the working fluid storing part 23 and the vent hole 13 from the outer side when seen planar to apply the oil barrier to the trench for oil barrier 25 and prevent the working fluid 20 from leaking to the outer side when supplying the working fluid 20.

In the first embodiment, a case in which the cover 5 is depressed to form the adhesive inflow allowing space 26 is explained. In this case, the adhesive inflow allowing space can be inexpensively and easily formed by using the resin molded article and the like for the cover 5. However, in place thereof, a concave part may be formed at a location of the sleeve 2 facing the cover (location between the adhesive setting and bonding part, and the space region on the open end side between the cover 5 and the sleeve 2), and a concave part may be formed in both the cover 5 and the sleeve 2 to configure the adhesive inflow allowing space 26.

Figure 12:
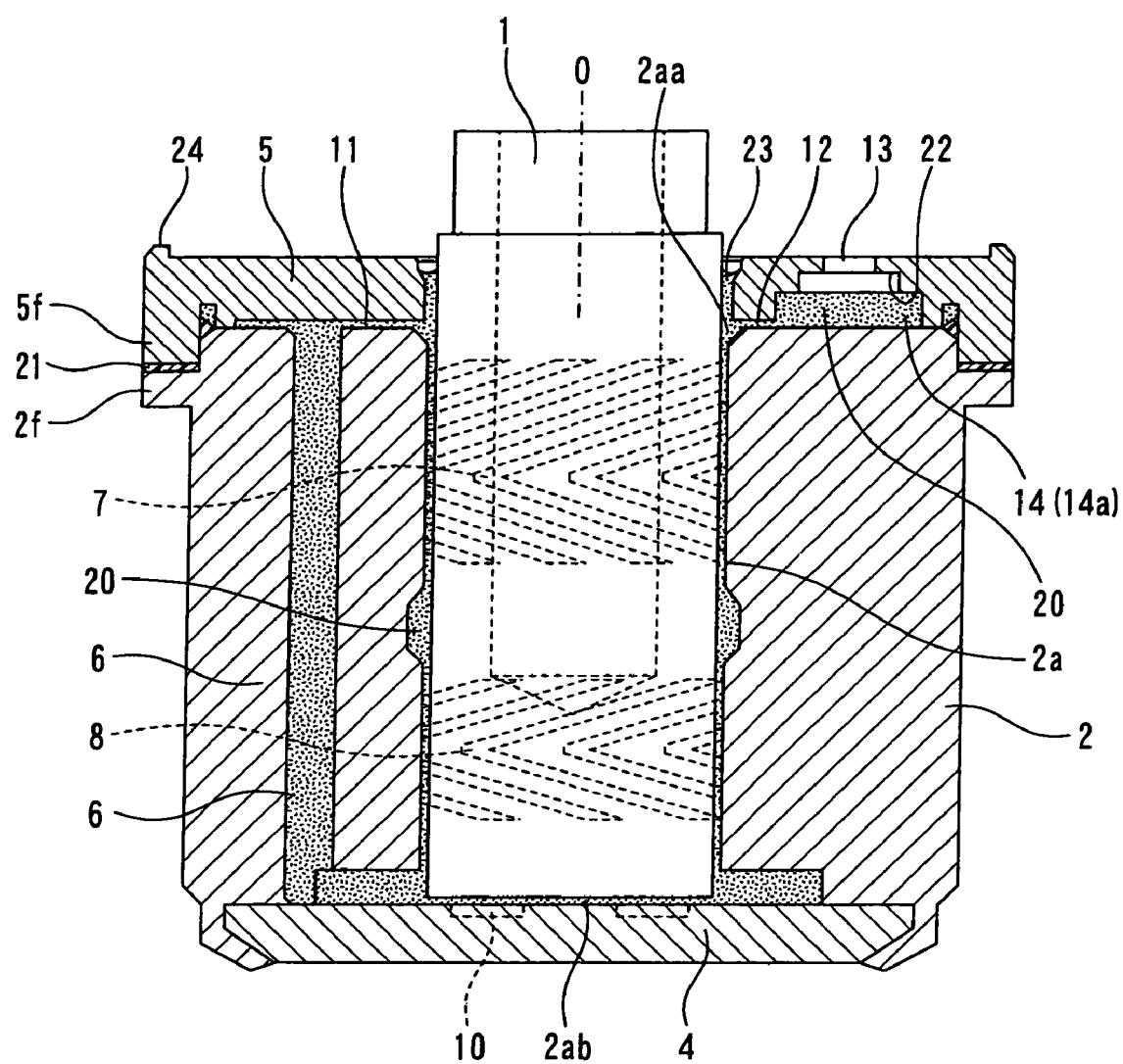
FIG. 12 is a cross sectional view of a hydrodynamic bearing device according to another embodiment of the invention.
Figure 13:
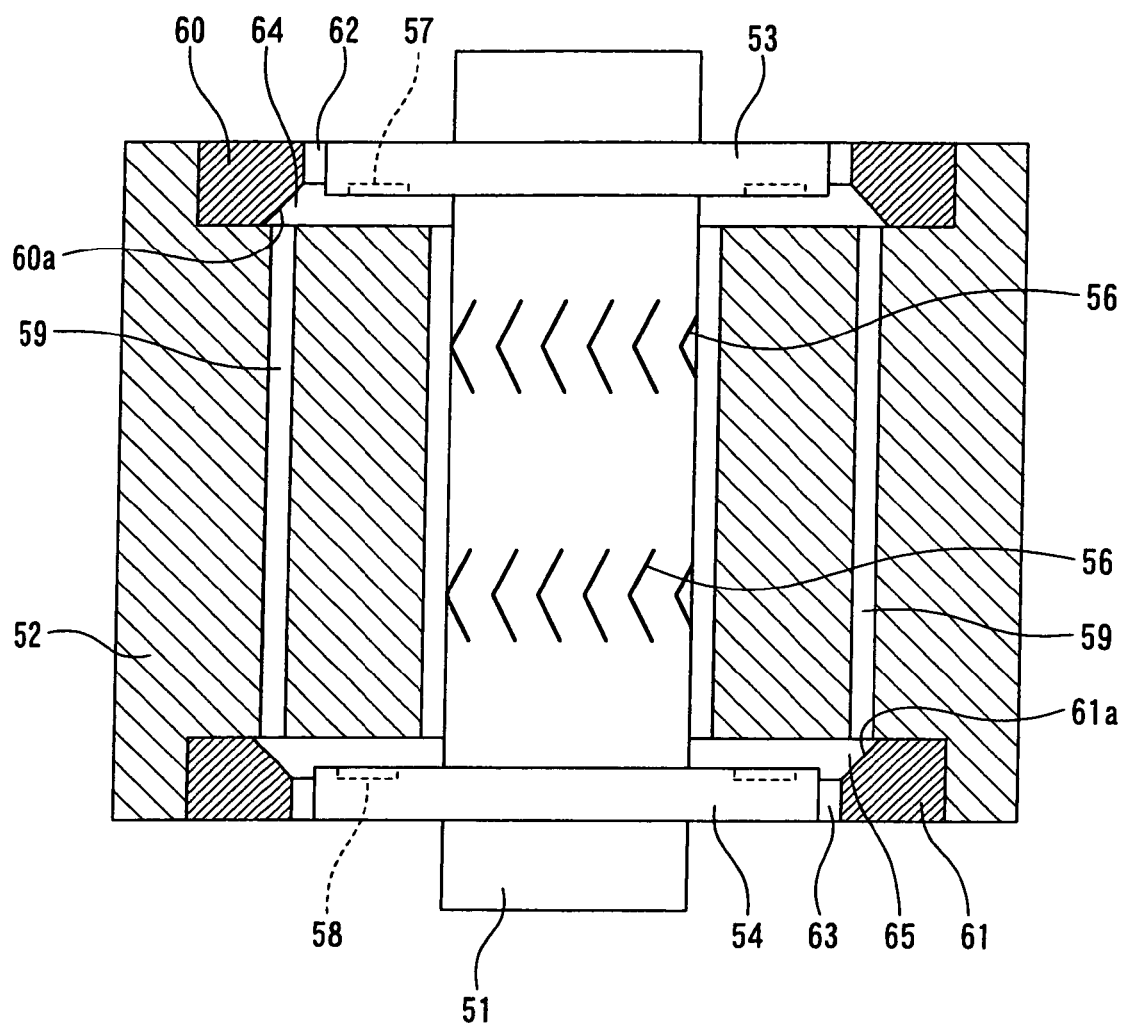
FIG. 13 is a cross sectional view of a conventional hydrodynamic bearing device.

In the first embodiment, a case of including a thrust flange 3 of thick diameter at the lower end of the shaft 1, a so-called shaft with flange is described, but is not limited thereto, and as shown in FIG. 12, it is also applicable to a configuration in which the thrust flange 3 is not arranged and the dynamic pressure generating groove for the thrust hydrodynamic bearing is formed on at least one of the opposing surfaces of the lower end of the shaft 1 and the thrust plate 4, or to a configuration, not shown, in which the thrust flange 3 is not arranged, and a pivot part is arranged at the lower end part of the shaft 1 so as to be position regulated in the thrust direction with respect to a plate member that closes the close region. Similar advantages are of course also obtained in the above configuration or in a so-called flangeless shaft.

Second Embodiment

In the first embodiment, the hydrodynamic fluid bearing having a configuration in which the circular communication path is arranged and the working fluid is circulated by having the dynamic pressure generating grooves of the radial bearing asymmetric to each other is explained. However, with regards to the adhering configuration, it may be applied without being limited to the bearing of the above configuration. Further, it may be applied to the close side of the sleeve.

What is claimed is:

1. A hydrodynamic bearing device comprising:
    a shaft;
    a sleeve including a bearing hole with an open end that opens and a close end that is closed, the shaft being inserted into the bearing hole for freely rotating with a predetermined gap in between;
    a cover attached to the sleeve and covering an end face on the open end side of the sleeve in an orientation of including a space;
    a radial dynamic pressure generating groove formed on at least one of an outer peripheral surface of the shaft and an inner peripheral surface of the sleeve where the shaft and the sleeve face each other, the dynamic pressure generating groove supporting the shaft with respect to the sleeve in a relatively rotatable fashion in a radial direction in a non-contacting manner;
    a circular communication path formed in the sleeve, for communicating a space region on the close end face of the sleeve and a space region on the open end side between the cover and the end face on the open end side of the sleeve; and
    a working fluid being filled into a space in the sleeve including at least one part of the space region on the open end side between the cover and the sleeve, whereby when the shaft is relatively rotated with respect to the sleeve, the working fluid is circulated through a space between the shaft and the sleeve, the space region on the close end side leading to the space between the shaft and the sleeve, the circular communication path leading to the space region on the close end side, and the space region on the open end side between the cover and the sleeve leading to the circular communication path, wherein
    an adhesive inflow allowing space is formed between an adhesive setting and bonding part for setting the adhesive and bonding the cover and the sleeve, and the space region on the open end side between the cover and the sleeve for circulating and introducing the working fluid, so as to include a space in at least one of the cover and the sleeve to allow the inflow of the adhesive from the adhesive setting and bonding part.

2. The hydrodynamic bearing device according to claim 1, wherein
    the adhesive inflow allowing space is formed by a groove depressed across the entire circumference of the respective joining faces in at least the cover or the sleeve.

3. The hydrodynamic bearing device according to claim 1, wherein
    a communication part is formed for communicating the space region on the open end side between the cover and the sleeve and the adhesive inflow allowing space and allowing the working fluid to flow into the adhesive inflow allowing space.

4. The hydrodynamic bearing device according to claim 3, wherein
    the communication part is formed at a position proximate to the open end of the sleeve with respect to a bearing axis direction than an inside surface of the cover facing the space region on the open end side to create a step between the inside surface of the cover and the communication part.

5. The hydrodynamic bearing device according to claim 1, wherein
collars are formed respectively at the cover and the sleeve across the entire circumference of the outer periphery side so as to face each other,
a clearance is formed between the collars by bringing the end face of the peripheral wall forming the adhesive inflow allowing space and the end face on the open end side of the sleeve into contact to each other for positioning, the clearance thus contacting the end faces of the cover and the sleeve, and
the adhesive is fed and set between the collars to configure the adhesive setting and bonding part.

6. The hydrodynamic bearing device according to claim 1, wherein
the setting amount of the adhesive is greater than the capacity of the adhesive setting and bonding part, and less than the capacity of the capacity of the adhesive inflow allowing space and the capacity of the adhesive setting and bonding part combined.

7. The hydrodynamic bearing device according to claim 1, wherein
an introducing minimum clearance part for causing capillary phenomenon is formed to extend to the open end of the bearing hole from a location in a proximity of the opening of the circular communication path in the space region on the open end side between the cover and the sleeve, so that the working fluid from the circular communication path flows into the bearing hole of the sleeve due to the capillary phenomenon,
a vent hole leading to an outside air is formed at a location not formed with the introducing minimum clearance part of the cover, and
a fluid storage space for storing the working fluid is formed by being depressed so as to become a space larger than the clearance of the introducing minimum clearance part at the inside surface part of the cover facing the end face on the open end side of the sleeve, thereby to communicate the introducing minimum clearance part and the vent hole in the circumferential direction.

8. The hydrodynamic bearing device according to claim 1, wherein
a space region on the close end face side of the sleeve is a space region where a thrust flange fixed to a distal end of the shaft is arranged, and
the opening of the circular communication path arranged on the close end face of the sleeve is connected to the space where the thrust flange faces.

9. The hydrodynamic bearing device according to claim 1, wherein
a space region on the close end face of the sleeve is a space region defined by a distal end of the shaft and a close end face region close plate, and
the opening of the circular communication path arranged on the close end face side of the sleeve is connected to the space where the distal end of the shaft faces.

10. The hydrodynamic bearing device according to claim 1, wherein
the radial dynamic pressure generating groove is formed into a shape that applies circulating force to the working fluid.

11. A spindle motor comprising the hydrodynamic bearing device according to claim 1.

12. A hydrodynamic bearing device comprising:
a shaft;
a sleeve including a bearing hole with an open end that opens and a close end that is closed, the shaft being inserted into the bearing hole for freely rotating with a predetermined gap in between;
a cover attached to the sleeve and covering an end face on the open end side of the sleeve in an orientation of including a space; and
a working fluid being filled into a space in the sleeve including at least one part of a space region on the open end side between the cover and the sleeve, wherein
an adhesive inflow allowing space is formed between an adhesive setting and bonding part for setting the adhesive and bonding the cover and the sleeve, and the space region on the open end side between the cover and the sleeve, so as to include a space in at least one of the cover and the sleeve to allow the inflow of the adhesive from the adhesive setting and bonding part.

13. The hydrodynamic bearing device according to claim 12, wherein
the adhesive inflow allowing space is formed by a groove depressed across the entire circumference of the respective joining faces in at least the cover or the sleeve.

14. The hydrodynamic bearing device according to claim 12, wherein
a communication part is formed for communicating the space region on the open end side between the cover and the sleeve and the adhesive inflow allowing space and allowing the working fluid to flow into the adhesive inflow allowing space.

15. The hydrodynamic bearing device according to claim 12, wherein
the communication part is formed at a position proximate to the open end of the sleeve with respect to a bearing axis direction than an inside surface of the cover facing the space region on the open end side to create a step between the inside surface of the cover and the communication part.

16. The hydrodynamic bearing device according to claim 12, wherein
collars are formed respectively at the cover and the sleeve across the entire circumference of the outer periphery side so as to face each other,
a clearance is formed between the collars by bringing the end face of the peripheral wall forming the adhesive inflow allowing space and the end face on the open end side of the sleeve into contact to each other for positioning, the clearance thus contacting the end faces of the cover and the sleeve, and
the adhesive is fed and set between the collars to configure the adhesive setting and bonding part.

17. The hydrodynamic bearing device according to claim 12, wherein
the setting amount of the adhesive is greater than the capacity of the adhesive setting and bonding part, and less than the capacity of the capacity of the adhesive inflow allowing space and the capacity of the adhesive setting and bonding part combined.

18. A spindle motor comprising the hydrodynamic bearing device according to claim 12.

* * * * *